Dec. 20, 1966　　　RINZO IWAI ETAL　　　3,293,460
ELECTRIC STEPPING MOTOR WITH A NON-MAGNETIC SPACER
BETWEEN ADJACENT ROTOR SECTIONS
Filed June 1, 1965　　　　　　　　　　　　　　2 Sheets-Sheet 1
FIG. 1
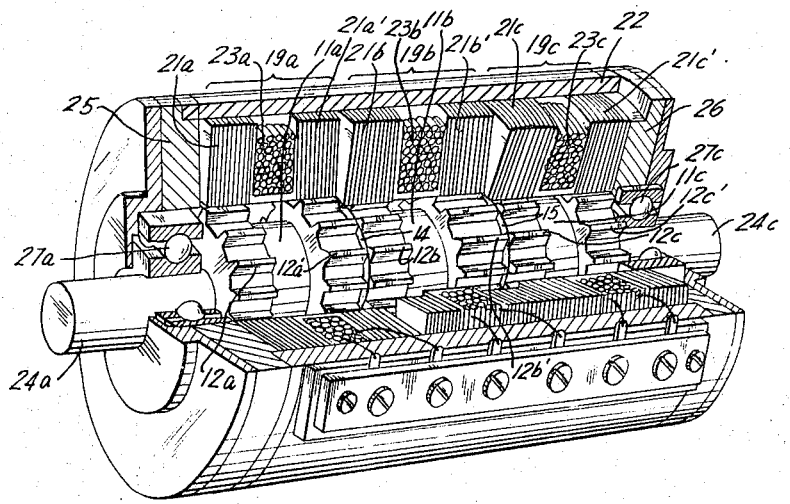
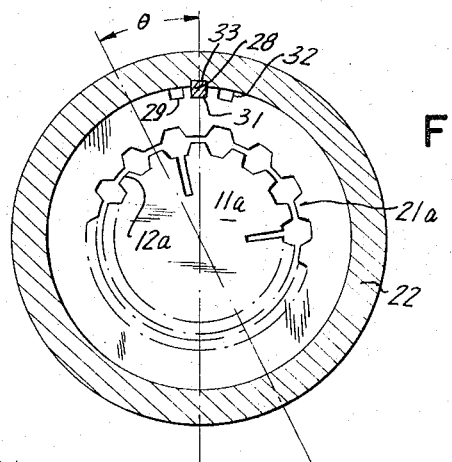
FIG. 7
FIG. 8
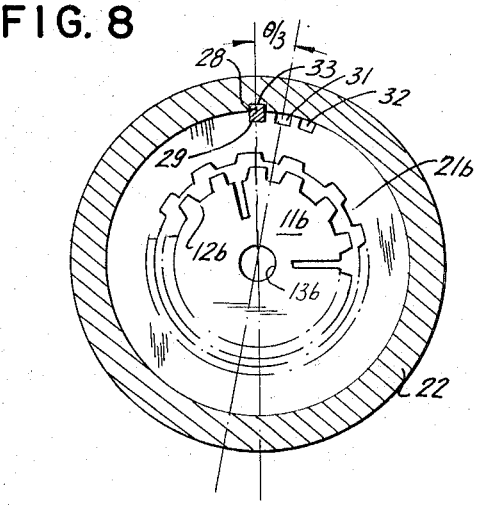
FIG. 9
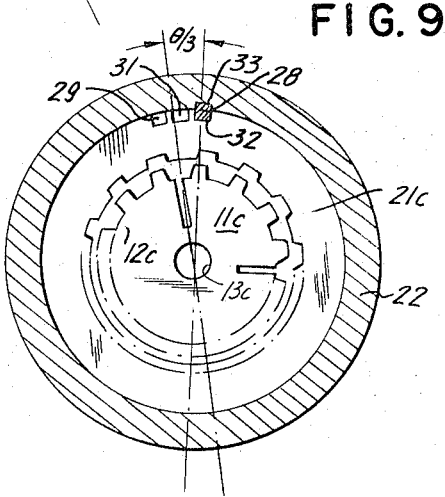

Dec. 20, 1966   RINZO IWAI ETAL   3,293,460
ELECTRIC STEPPING MOTOR WITH A NON-MAGNETIC SPACER
BETWEEN ADJACENT ROTOR SECTIONS
Filed June 1, 1965   2 Sheets-Sheet 2

_United States Patent Office_

3,293,460
Patented Dec. 20, 1966

3,293,460
ELECTRIC STEPPING MOTOR WITH A NON-
MAGNETIC SPACER BETWEEN ADJACENT
ROTOR SECTIONS
Rinzo Iwai, Tokyo, and Hiroshi Iwano, Mitaka-shi, Japan, assignors to Fujitsu Limited, Kawasaki, Japan, a corporation of Japan
Filed June 1, 1965, Ser. No. 460,188
Claims priority, application Japan, Feb. 22, 1960, 35/8,367
3 Claims. (Cl. 310—49)

The present application is a continuation-in-part of pending application Serial No. 89,955, filed February 17, 1961 and entitled "Electric Stepping Motor."

The present invention relates to an electric stepping motor. More particularly, the invention relates to an electric stepping motor having high torque and response characteristics.

The principal object of the present invention is to provide a new and improved electric stepping motor.

An object of the present invention is to provide an electric stepping motor having a high torque output and a high response characteristic.

Another object of the present invention is to provide an electric stepping motor of compact size and simple, but sturdy and reliable, structure.

Another object of the present invention is to provide an electric stepping motor having a plurality of rotor portions and a plurality of stator portions, in which flux produced by each stator portion flows substantially only through the corresponding rotor portion.

In order that the present invention may be readily carried into effect, it will now be described with reference to the accompanying drawings, wherein:

FIG. 1 is a perspective view of an embodiment of the electric stepping motor of the present invention;

FIG. 7 is a section taken along the lines VII—VII of FIG. 2;

FIG. 8 is a section taken along the lines VIII—VIII of FIG. 2; and

FIG. 9 is a section taken along the lines IX—IX of FIG. 2.

In the figures, the same components are identified by the same reference numbers.

Figure 2:
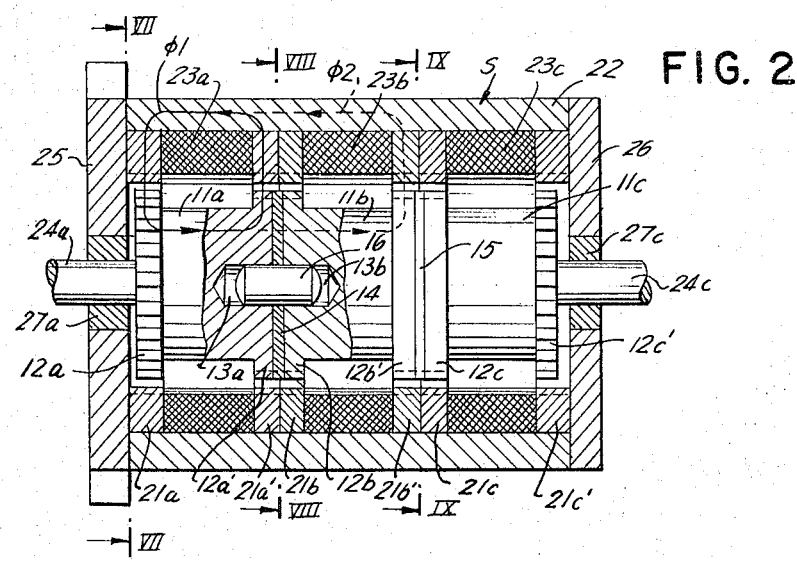
FIG. 2 is a longitudinal view, partly in section, of the embodiment of FIG. 1.

In the figures, the stepping motor comprises a rotor having a plurality of rotor sections or portions 11a, 11b and 11c. Each of the rotor sections 11a, 11b and 11c is of substantially cylindrical configuration having rotor teeth projecting radially at both base ends, so that it is of substantially spool-like configuration. Thus, as illustrated in FIGS. 1, 2, 3 and 4, each rotor section 11a, 11b and 11c comprises spaced radially projecting teeth. The rotor section 11a has spaced, radially projecting teeth 12a and 12a', the rotor section 11b has spaced, radially projecting teeth 12b and 12b', and the rotor section 11c has spaced, radially projecting teeth 12c and 12c'.

Figure 3:
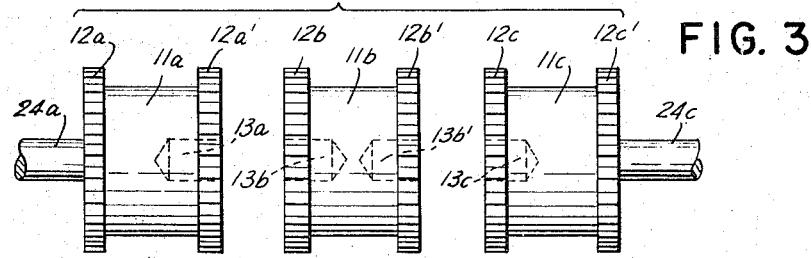
FIG. 3 is an exploded view of the rotor of the embodiment of FIG. 1.

Each of the rotor portions 11a and 11c has a single axial bore formed therein and the rotor portion 11b has two axial bores formed therein. Thus the rotor portion 11a has an axial bore 13a formed therein (FIGS. 2, 3 and 4), the rotor portion 11c has an axial bore 13c formed therein (FIG. 3), and the rotor portion 11b has two axial bores 13b and 13b' formed therein (FIG. 3). Each of the rotor sections 11a, 11b and 11c comprises a high permeability magnetic material such as, for example, Permalloy.

Figure 5:
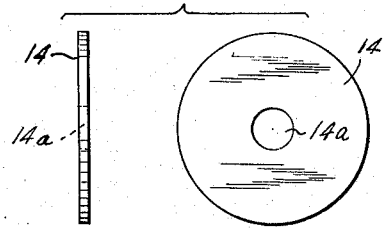
FIG. 5 is two views of a shim plate of the embodiment of FIG. 1.

A shim plate 14 of non-magnetic material is positioned substantially coaxially between the rotor sections 11a and 11b and a shim plate 15 of non-magnetic material is positioned substantially coaxially between the rotor sections 11b and 11c. The shim plates 14 and 15 are identical. Each of the shim plates 14 and 15 has an axial bore formed therethrough. The shim plate 14 has an axial bore 14a formed therethrough (FIG. 5) and the shim plate 15 has an axial bore 15a formed therethrough. Each of the shim plates has a small thickness and a high reluctance and may comprise any suitable non-magnetic material such as, for example, copper or Phosphor bronze.

Figure 4:
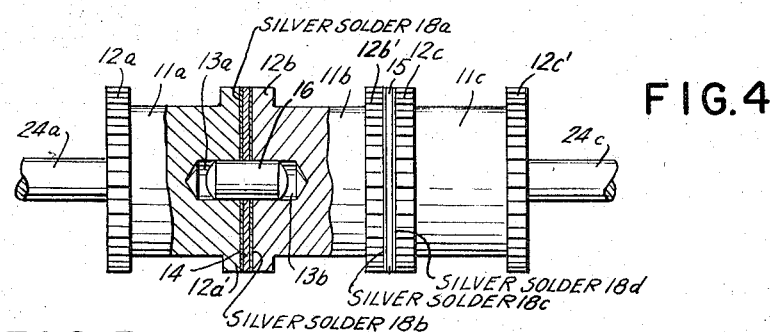
FIG. 4 is a view, partly in section, of the rotor of the embodiment of FIG. 1.
Figure 6:
FIG. 6 is two views of a key of the embodiment of FIG. 1.

The rotor portions 11a, 11b and 11c and the intermediate shim plates 14 and 15 are coaxially positioned and affixed to each other to form the rotor. The rotor portions and shim plates are affixed to each other by solder and by pins or keys (FIG. 6). As shown in FIGS. 2 and 4, a pin 16 is passed through the bore 14a of the shim plate 14 and into the bore 13a of the rotor section 11a and the bore 13b of the rotor section 11b.' A pin 17 (not shown) is passed through the bore (not shown) of the shim plate 15 and into the bore 13b' of the rotor section 11b and the bore 13c of the rotor section 11c. The coaxially positioned pins 16 and 17 function to prevent mutual rotation of the rotor sections 11a, 11b and 11c and to maintain said rotor sections in coaxial alignment.

Each of the shim plates 14 and 15 is affixed to its adjoining rotor sections by any suitable means such as, for example, solder. Thus, the shim plate 14 is affixed to the substantially planar base surface adjacent the teeth 12a' of the rotor section 11a by silver solder 18a, the shim plate 14 is affixed to the substantially planar base surface adjacent the teeth 12b of the rotor section 11b by silver solder 18b, the shim plate 15 is affixed to the substantially planar base surface adjacent the teeth 12b' of the rotor section 11b' by silver solder 18c, and the shim plate 15 is affixed to the substantially planar base surface adjacent the teeth 12c of the rotor section 11c by silver solder 18d.

The rotor, as shown in FIG. 4, is thus an integral unit of coaxially aligned rotor portions and interposed non-magnetic shim plates. The individual rotor sections and the shim plates may be fastened or affixed as a unit in coaxial alignment by any suitable fastening means such as, for example, bolts, pins, rivets or the like.

The stepping motor of the present invention comprises a stator having a plurality of stator sections or portions 19a, 19b and 19c. Each of the stator portions 19a, 19b and 19c is of substantially annular configuration and comprises a high permeability magnetic material such as, for example, Permalloy. Each of the stator portions is coaxially positioned around a corresponding one of the rotor portions. The stator portion 19a is coaxially positioned around the rotor portion 11a, the stator portion 19b is coaxially positioned around the rotor portion 11b, and the stator portion 19c is coaxially positioned around the rotor portion 11c.

Each of the stator sections 19a, 19b and 19c has stator teeth projecting radially at both base ends. Thus, as illustrated in FIGS. 1 and 2, each stator section 19a, 19b and 19c comprises spaced radially projecting teeth. The stator section 19a has spaced, radially projecting teeth 21a and 21a', the stator section 19b has spaced, radially projecting teeth 21b and 21b', and the stator section 19c has spaced, radially projecting teeth 21c and 21c'.

The stator sections 19a, 19b and 19c are affixed to a support or housing cylinder 22 by any suitable fastening means in coaxially aligned position with the rotor and with the stator teeth 21a and the rotor teeth 12a in alignment in planes substantially perpendicular to the axis of said rotor. The stator teeth 21a' and the rotor teeth 12a' are in alignment in planes substantially perpendicular to the axis of the rotor, the stator teeth 21b and the rotor teeth 12b are in alignment in planes substantially perpendicular to the axis of the rotor, the stator teeth 21b' and the rotor teeth 12b' are in alignment in planes substantially perpendicular to the axis of the rotor, the stator teeth 21c and the rotor teeth 12c are in alignment in planes substantially perpendicular to the axis of the rotor, and the stator teeth 21c' and the rotor teeth 12c' are in alignment in planes substantially perpendicular to the axis of the rotor.

The housing cylinder 22 comprises magnetizable material. The axial width of each of the stator teeth is equal to the axial width of each of the rotor teeth, so that the teeth of each stator section form spaced, substantially annular sections and the teeth of each rotor section form spaced substantially annular sections, with the corresponding stator and rotor tooth sections being bounded by the same planes substantially perpendicular to the axis of the stator and the axis of the rotor.

Each of the stator sections 19a, 19b and 19c comprises a substantially annular stator winding positioned coaxially with and between the teeth thereof. The stator section 19a comprises a stator winding 23a positioned coaxially with and between the teeth 21a and 21a' of said section, the stator section 19b comprises a stator winding 23b positioned coaxially with and between the teeth 21b and 21b' of said section, and the stator section 19c comprises a stator winding 23c positioned coaxially with and between the teeth 21c and 21c' of said section.

Each of the stator portions 19a, 19b and 19c, thus comprises a stator winding and stator teeth on both sides of said winding. The winding of each stator portion may be affixed to the housing cylinder 22 or to the stator teeth of that stator portion, or both, or may be otherwise affixed, in any suitable manner, by any suitable means. The stator winding of each stator portion is coaxially positioned around the center section of the corresponding rotor portion between the rotor teeth of said rotor portion. The stator winding 23a is coaxially positioned around the center section of the rotor section 11a which center section is between the rotor teeth 12a and 12a', the stator winding 23b is coaxially positioned around the center section of the rotor section 11b which center section is between the rotor teeth 12b and 12b', and the stator winding 23c is coaxially positioned around the center section of the rotor section 11c which center section is between the rotor teeth 12c and 12c' (FIGS. 1 and 2).

The axis of the rotor coincides with the axis of a rotor shaft which extends from the axial ends of the rotors and is affixed to the rotor sections 11a and 11c. The rotor shaft portion 24a is coaxially affixed to the rotor sector 11a and the rotor shaft portion 24c is coaxially affixed to the rotor sector 11c. The rotor shaft is supported for rotation by substantially annular housing or support end plates. The rotor shaft portion 24a is supported for rotation by a substantially annular housing or support end plate 25 and the rotor shaft portion 24c is supported for rotation by a substantially annular housing or support end plate 26 (FIGS. 1 and 2).

The rotor shaft portion 24a rotates in a bearing 27a coaxially mounted in the axial area of the housing end plate 25 and the rotor shaft portion 24c rotates in a bearing 27c coaxially mounted in the axial area of the housing end plate 26. The rotor rotates freely in the housing formed by the housing cylinder 22 and the housing end plates 25 and 26.

section is equal to the number of radially projecting teeth

The number of radially projecting teeth of each stator of each corresponding rotor section. Thus, the rotor teeth 12a are equal in number to the stator teeth 21a, the rotor teeth 12a' are equal in number to the stator teeth 21a', the rotor teeth 12b are equal in number to the stator teeth 21b, the rotor teeth 12b' are equal in number to the stator teeth 21b', the rotor teeth 12c are equal in number to the stator teeth 21c, and the rotor teeth 12c' are equal in number to the stator teeth 21c'.

The teeth of the rotor sections are in axial alignment with each other. Thus, the rotor teeth 12a, 12a', 12b, 12b', 12c and 12c' are all in axial alignment with each other. The teeth of the stator sections are angularly displaced from each other. Thus, the stator teeth 21a and 21a' are in axial alignment with each other, but are displaced by one third the pitch, or θ/3, from the stator teeth 21b and 21b'; θ being the pitch. The stator teeth 21a and 21a' are displaced by one third the pitch from the stator teeth 21c and 21c'.

The stator teeth 21b and 21b' are in axial alignment with each other, but are displaced by one third the pitch from the stator teeth 21a and 21a' and by one third the pitch from the stator teeth 21c and 21c'. The stator teeth 21c and 21c' are in axial alignment with each other, but are displaced by one third the pitch from the stator teeth 21a and 21a' and by one third the pitch the stator teeth 21b and 21b'.

FIGS. 7, 8 and 9 illustrate the angular positions of the rotor and stator teeth. FIG. 7 illustrates the angular relationship of the rotor teeth 12a and 12a' with the stator teeth 21a and 21a'; FIG. 7 being a view taken along the lines VII–VII of FIG. 1. FIG. 8 illustrates the angular relationship of the rotor teeth 12b and 12b' with the stator teeth 21b and 21b'; FIG. 8 being a view taken along the lines VIII—VIII of FIG. 1. FIG. 9 illustrates the angular relationship of the rotor teeth 12c and 12c' with the stator teeth 21c and 21c'; FIG. 9 being a view taken along the lines IX—IX of FIG. 1.

The stator teeth may be angularly positioned by a position key 28, a plurality of grooves or channels 29, 31 and 32 formed in the peripheral surface of the stator tooth sections, and a groove or channel 33 formed in the housing cylinder. The radial center of each of the grooves 29, 31 and 32 is angularly displaced by one third the pitch from the radial center of the next adjacent one or ones of said grooves.

In FIG. 7, the position key 28 is positioned in the housing groove 33 and the stator groove 31 so that the rotor teeth 12a are in axial alignment with the stator teeth 21a. In FIG. 8, the position key 28 is positioned in the housing groove 33 and the stator groove 29 so that the rotor teeth 12b are angularly displaced by one third the pitch from the stator teeth 21b. In FIG. 9, the position key 28 is positioned in the housing groove 33 and the stator groove 32 so that the rotor teeth 12c are angularly displaced by one third the pitch from the stator teeth 21c. The position key 28 is placed in the housing groove and in each desired stator groove prior to the fastening of the stator sections together to form the stator.

The stepping motor of the present invention is driven by the application of exciting current to the stator windings 23a, 23b and 23c. This produces stepwise rotation of the rotor by applying torque to each of the rotor portions in turn, each time moving the rotor by one third the pitch in the positive or negative direction. The stepping of the motor results from the angular positioning of the stator teeth by angular positioning of the stator sections.

Excitation of the stator windings may produce leakage flux between adjacent rotor sections or stator sections. This decreases the torque output of the motor and impairs the response characteristic. Thus, as shown in FIG. 2, when only the stator winding 23a is energized, fluxes $\phi_1$ and $\phi_2$ may flow. The flux $\phi_1$ causes the rotation of the rotor portion 11a through an angle corresponding to one third the pitch of the rotor teeth in the direction determined by the flux.

The flux $\phi_2$ is a leakage flux which slows the rotation of the rotor by its interaction with the rotor portion 11b. The total torque applied to the rotor would be less than that desired, in such a case. The non-magnetic high reluctance shim plates 14 and 15 of the present invention reduce the leakage flux to a negligible magnitude, however, and thereby greatly increase and improve the torque output and the response characteristic of the motor.

The non-magnetic shim plates 14 and 15 function to magnetically separate the rotor portions from each other and thereby provide a high torque output and high response characteristic while retaining a compact and simple, but sturdy and reliable structure. Furthermore, the non-magnetic shim plates permit the rotor sections to be affixed to each other by simple means such as, for example soldering or bolting. This greatly facilitates the manufacture of the complete rotor and permits a reduction to a compact motor size, because the non-magnetic shim plates are thin.

While the invention has been described by means of specific examples and in a specific embodiment, we do not wish to be limited thereto, for obvious modifications will occur to those skilled in the art without departing from the spirit and scope of the invention.

We claim:
1. A stepping motor, comprising
   a plurality of magnetic rotor portions adjacent each other in an axial direction, each of said rotor portions having radially extending teeth;
   a plurality of magnetic stator portions adjacent each other in an axial direction, each of said stator portions having radially extending teeth projecting toward the teeth of a corresponding one of said rotor portions, each of said stator portions being positioned coaxially and magnetically interlinked with and surrounding the corresponding one of said rotor portions, the teeth of each of said stator portions being angularly displaced from the teeth of the others of said stator portions;
   a non-magnetic plate positioned between each pair of adjacent rotor portions and forming a magnetic separation therebetween; and
   means affixing each non-magnetic plate to each of the rotor portions between which it is positioned.

2. A stepping motor, comprising
   a plurality of magnetic rotor portions adjacent each other in an axial direction, each of said rotor portions having radially extending teeth, the teeth of each of said rotor portions being axially aligned with the teeth of the others of said rotor portions;
   a plurality of magnetic stator portions adjacent each other in an axial direction, each of said stator portions having radially extending teeth projecting toward the teeth of a corresponding one of said rotor portions, each of said stator portions being positioned coaxially and magnetically interlinked with and surrounding the corresponding one of said rotor portions, the teeth of each of said stator portions being angularly displaced from the teeth of the others of said stator portions;
   a non-magnetic plate positioned between each pair of adjacent rotor portions and forming a magnetic separation therebetween; and
   means affixing each non-magnetic plate to each of the rotor portions between which it is positioned.

3. A stepping motor, comprising
   a plurality of magnetic rotor portions adjacent each other in an axial direction, each of said rotor portions having radially extending teeth, the teeth of each of said rotor portions being axially aligned with the teeth of the others of said rotor portions;
   a plurality of magnetic stator portions adjacent each other in an axial direction, each of said stator portions having radially extending teeth projecting toward the teeth of a corresponding one of said rotor portions, each of said stator portions being positioned coaxially and magnetically interlinked with and surrounding the corresponding one of said rotor portions, the teeth of each of said stator portions being angularly displaced from the teeth of the others of said stator portions; the teeth of most of said stator portions being angularly displaced from the teeth of the corresponding ones of said rotor portions;
   a non-magnetic plate positioned between each pair of adjacent rotor portions and forming a magnetic separation therebetween; and
   means affixing each non-magnetic plate to each of the rotor portions between which it is positioned.

References Cited by the Examiner

UNITED STATES PATENTS

| | | | |
|---|---|---|---|
| 1,916,256 | 7/1933 | Chandeysson | 310—178 |
| 1,922,028 | 8/1933 | Chandeysson | 310—178 |
| 2,046,673 | 7/1936 | Chandeysson | 310—178 |
| 2,112,852 | 4/1938 | Lindell | 310—49 |
| 2,408,080 | 9/1946 | Lloyd | 310—178 |
| 2,548,633 | 4/1951 | Stephenson | 310—164 |
| 2,797,346 | 6/1957 | Ranseen | 310—49 |
| 2,808,556 | 10/1957 | Thomas | 310—49 |
| 2,830,247 | 4/1958 | Thomas | 310—49 |
| 2,943,313 | 6/1960 | Gordon | 310—49 |

MILTON O. HIRSHFIELD, *Primary Examiner.*

J. W. GIBBS, *Assistant Examiner.*